July 30, 1963 P. KOLLSMAN 3,099,615
ELECTRODIALYSIS INVOLVING PERIODIC CURRENT REVERSAL
Filed Feb. 13, 1961

INVENTOR.
Paul Kollsman
BY
Howard G. Russell
his ATTORNEY

United States Patent Office 3,099,615
Patented July 30, 1963

3,099,615
ELECTRODIALYSIS INVOLVING PERIODIC
CURRENT REVERSAL
Paul Kollsman, New York, N.Y.
Filed Feb. 13, 1961, Ser. No. 89,051
5 Claims. (Cl. 204—180)

In the operation of electrodialysis apparatus employing ion selective membranes difficulties are encountered if the liquid being treated contains particles of a size which clog the membrane pores.

It has been suggested to clear the pores of membranes of a conventional electrodialysis apparatus comprising concentrating and diluting chambers in alternating arrangement by periodically reversing the direction of the direct electric current and simultaneously interchanging the flows of concentrate and dilute by an appropriate valve arrangement.

The suggested procedure entails the disadvantage that a certain volume of concentrate in the concentrate passages just ahead of the valves pass into the dilute stream when the concentrating chambers become diluting chambers upon current reversal.

The invention provides a method and apparatus by means of which the membrane clearing advantages of the current reversal are achieved without the complication of valving and the disadvantage of periodic contamination of the dilute by a volume of concentrate entering the dilute stream.

The various aims, objects and advantages of this invention will appear more fully from the detailed description which follows accompanied by drawings showing, for the purpose of illustration, certain forms of apparatus for practicing the invention.

Although the characteristic features of this invention which are believed to be novel will be particularly pointed out in the claims appended hereto, the invention itself, its objects and advantages, and the manner in which it may be carried out, may be better understood by referring to the following description taken in connection with the accompanying drawings forming a part of it in which:

Figure 1:
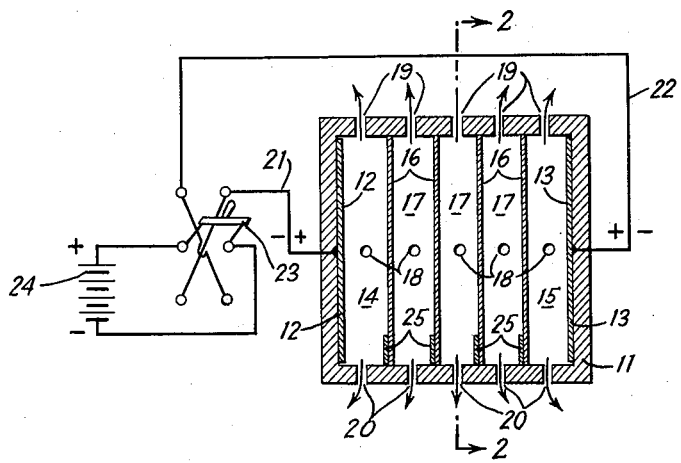
FIG. 1 is a diagrammatic vertical section of an electrodialysis apparatus employing ion selective membranes of the same polarity, the section being taken on line 1—1 of FIG. 2.
Figure 2:
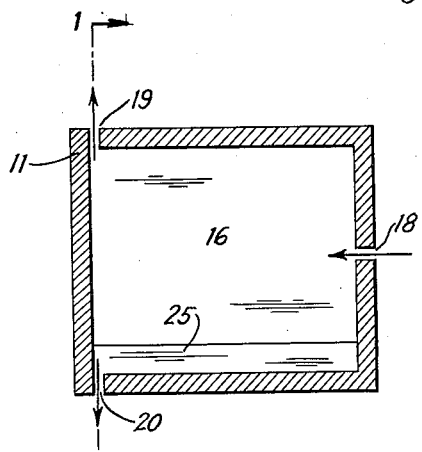
FIG. 2 is a diagrammatic vertical section of the apparatus of FIG. 1 taken at right angles to the view of FIG. 1, the section being taken on line 2—2.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it is understood that structural details may be modified in various respects without departure from the principles of the invention and that the invention may be practiced by other forms of apparatus than shown.

The cell 11 of FIG. 1 comprises electrodes 12 and 13 in electrode compartments 14 and 15. Ion selective membranes 16 subdivide the cell space between the electrodes into treatment chambers 17 having an inlet port 18 for liquid to be treated and discharge ports 19 and 20 for dilute and concentrate, respectively.

The membranes separating the treatment chambers may all be of the same polarity, for example, they may be anion membranes or cation membranes.

Leads 21 and 22 connect the electrodes 12 and 13 with a reversing switch 23 and a source of direct current 24.

In operation ions of one polarity collect at the surface of the membranes whose polarity makes the membranes passage resistant to the ions of said one polarity and ions of the opposite polarity passing through the membranes combine with the accumulated ions of the one polarity and form a concentrate. Under the influence of gravity the concentrate sinks to the bottom of the chamber and may be withdrawn through the passages 20. Dilute collects at the top of the chambers and may be withdrawn through passages 19.

The concentrate layer at the bottom of the chambers has a considerably lower resistivity than the remainder of the liquid. The current density within the lower portion of the chambers is preferably reduced, for reason of economy, by insulating barriers 25 shielding the concentrate pool at the bottom.

Reversal of the electrode polarity by operation of the switch 23 causes the concentrate to form on the opposite membrane surface. Ions to which the membranes are permeable now pass through the membranes in the opposite direction and impurities adsorbed to the membranes are removed, but the concentrate continues to collect at the bottom and the dilute at the top of the chambers, as before the current reversal.

There is therefore no danger of contamination of one dilute flow by a certain volume of concentrate containing the dilute stream, as is the case in prior dialysis apparatus in which the flow of the dilute had to be interchanged with the concentrate every time the current is reversed.

Figure 3:
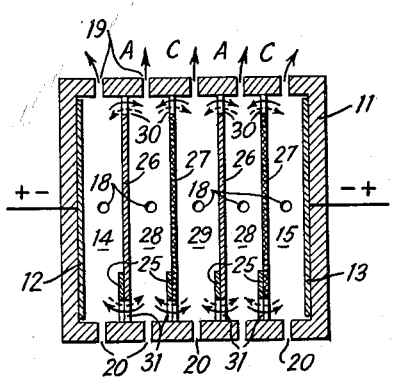
FIG. 3 is a diagrammatic vertical section of a modified apparatus employing ion selective membranes of two polarities arranged in alternating order.

In the apparatus of FIG. 3 two types of membranes 26 and 27 are arranged in alternating sequence. The membranes may be anion and cation membranes, or anion membranes may alternate with neutral or with amphoteric membranes. Similarly, cation membranes may alternate with neutral or amphoteric membranes.

The alternating arrangement of the membranes results in the formation of alternatingly arranged diluting and concentrating chambers. The chambers are designated 28 and 29.

Assuming chambers 28 are concentrating chambers and chambers 29 are diluting chambers with a certain membrane arrangement, the chambers interchange function upon current reversal so that chamber 28 becomes a diluting chamber and chamber 29 becomes a concentrating chamber.

Passages 30 are provided at the top of the chambers through which dilute may pass from one chamber into the next, and similar passages 31 at the bottom permit concentrate to flow from the bottom of the concentrating chambers into the bottom portion of the diluting chambers where it is not subject to retransfer through the membranes by the electric current because of the provision of insulating barriers 25.

Dilute is withdrawn from the top of the chambers through ducts 19 at all times and concentrate is withdrawn through ducts 20 regardless of the direction of the electric current.

*Example 1*

A cell was constructed according to FIG. 1 comprising 7 "Amfion" cation membranes forming 6 treatment chambers and 2 electrode chambers. The chambers measured 200 mm. in height, 200 mm. in width and 3 mm. in thickness. Sea water of 34,500 p.p.m. concentration was introduced into the chambers at one side, dilute and concentrate was withdrawn at the other side from the top and bottom, respectively. The liquid outflows were adjusted as follows:

Each electrode chamber: top 5 cc./min., bottom 5 cc./min. Treatment chambers collectively: top 15 cc./min., bottom 15 cc./min. Potential at electrodes: 6 volts D.C. Reversal every 3 hours. The dilute product of the treatment chambers was collected over a period of 2 days and was found to have a concentration of 5,100 p.p.m.

For the purpose of comparison the test was repeated without current reversal yielding a dilute of a concentration of 6,870 p.p.m.

*Example 2*

A cell was constructed according to FIG. 3 comprising 7 "Amfion" anion membranes and 6 "Amfion" cation membranes arranged in alternating sequence. The 12 treatment chambers measured 200 mm. in height, 200 mm. in width and 3 mm. in thickness. Slits of 2 mm. height and extending across the width of the membranes provided the passages 30 and 31 at the top and at the bottom of the chambers, respectively, through which dilute could pass into the concentrating chambers and concentrate into the diluting chambers, respectively. Sea water of 34,500 p.p.m. was introduced into the chambers through inlet ports 18 (FIG. 3) and dilute and concentrate was withdrawn through the top and bottom passages 19 and 20, respectively. Insulated partitions slotted in register with the passages 30 and 31 were provided to a height of 10 to 30 mm. from the bottom. The liquid outflows were adjusted as follows:

Each electrode chamber: top 10 cc./min., bottom 10 cc./min. Treatment chambers collectively: top 15 cc./min., bottom 15 cc./min. Potential at electrodes 8 volts D.C. Current reversal every 3 hours. The dilute product of the treatment chambers was collected over a period of 2 days and was found to have a concentration of 4290 p.p.m.

Without current reversal the ion content of the dilute was 6340 p.p.m. under otherwise identical conditions.

In an apparatus in which the membranes are of the same polarity, as shown in FIG. 1 for example, the membranes may be provided with perforations evenly distributed over the entire membrane surface, the perforations being less than 5% of the membrane area. Alternatively, slits or passages may be provided at the top and at the bottom of the membranes similar to the passages 30 and 31 of FIG. 3. The perforations or passages insure substantially equal concentration and deionization at the respective levels so that excessive deionization with a consequent reduction in current density in one or a few chambers is prevented.

In an apparatus comprising membranes of two polarities passages should be provided as shown in FIG. 3, but perforations distributed evenly over the membrane surface may be employed instead. If slits are employed, the width of the slit should be about equal to the width of the chamber and the height of the slit approximately equal to the membrane spacing.

What is claimed is:

1. The method of demineralizing an ionic solution comprising, the steps of feeding raw solution into certain chambers of an electrodialysis apparatus comprising a plurality of spaced membranes arranged between two electrode compartments, at least certain of said membranes being permeable to ions of one polarity and passage resistant to ions of the opposite polarity; passing a direct electric current in series across said membranes and chambers; withdrawing dilute product from each of said certain chambers from the top portion of the liquid therein; withdrawing concentrate product from said same certain chambers from the bottom portion of the liquid therein; and periodically reversing the direction of the electric current passing from electrode to electrode through said membranes and chambers, while maintaining the dilute and concentrate withdrawals unchanged.

2. The method of demineralizing an ionic solution comprising, the steps of feeding raw solution into a plurality of adjacent chambers of an electrodialysis apparatus comprising a plurality of spaced permselective ion exchange membranes of like polarity arranged between two electrode compartments; passing a direct electric current in series across said membranes and chambers; withdrawing dilute product from each of said chambers from the top portion of the liquid therein; withdrawing concentrate product from said chambers from the bottom portion of the liquid therein, feeding of solution, and withdrawal of dilute and concentrate products being into, and from the same individual chambers, respectively; and periodically reversing the direction of the electric current passing from electrode to electrode through said membranes and chambers, while maintaining the dilute and concentrate withdrawals unchanged.

3. The method of demineralizing an ionic solution comprising, the steps of feeding raw solution into the chambers of an electrodialysis apparatus comprising a plurality of spaced membranes of two kinds arranged in alternating sequence between two end electrode compartments, the membranes of one kind being permeable to ions of one polarity and passage resistant to ions of the opposite polarity, the membranes of the other kind being permeable to ions of said opposite polarity, the top portions of adjoining chambers being in hydraulic communication, and the bottom portions of adjoining chambers being in hydraulic communication; passing a direct electric current in series across said chambers and membranes; withdrawing dilute product from each of said chambers from the top portion of the liquid therein; withdrawing concentrate product from said chambers from the bottom portion of the liquid therein; and periodically reversing the direction of the electric current passing from electrode to electrode through said chambers and membranes while maintaining the dilute and concentrate withdrawals unchanged.

4. The method of demineralizing an ionic solution comprising, the steps of feeding raw solution into the chambers of an electrodialysis apparatus comprising a plurality of spaced membranes of two kinds arranged in alternating sequence between two end electrode compartments, the membranes of one kind being permeable to ions of one polarity and passage resistant to ions of the opposite polarity, the membranes of the other kind being permeable to ions of said opposite polarity, the top portions of adjoining chambers being in hydraulic communication, and the bottom portions of adjoining chambers being in hydraulic communication; passing a direct electric current in series through the upper portion of said chambers and membranes while insulating the lower portion to reduce passage of current through the latter; withdrawing dilute product from each of said chambers from the top portion of the liquid therein; withdrawing concentrate product from said chambers from the bottom portion of the liquid therein; and periodically reversing the direction of the electric current passing from electrode to electrode through said chambers and membranes while maintaining the dilute and concentrate withdrawals unchanged.

5. The method of treating natural saline water comprising, the steps of feeding the saline water into the chambers of an electrodialysis apparatus comprising a plurality of spaced membranes arranged between two electrode compartments, at least certain of said membranes being permeable to ions of one polarity and passage resistant to ions of the opposite polarity; passing a direct electric current in series across said chambers and membranes; withdrawing dilute from each of said chambers from the upper portion of the water therein; withdrawing saline concentrate from said chambers from the lower portion of the water therein, feeding of solution, and withdrawal of dilute and concentrate products being into, and from the same chambers, respectively; and periodically reversing the direction of the electric current flowing between the electrodes through said chambers and membranes while leaving the withdrawal of dilute and concentrate unchanged.

References Cited in the file of this patent
UNITED STATES PATENTS

| | | |
|---|---|---|
| 2,794,777 | Pearson | June 4, 1957 |
| 2,863,813 | Juda et al. | Dec. 9, 1958 |
| 2,872,407 | Kollsman | Feb. 3, 1959 |
| 2,878,178 | Bier | Mar. 17, 1959 |
| 2,947,688 | Murphy | Aug. 2, 1960 |